United States Patent
Bahar et al.

(10) Patent No.: US 12,352,459 B2
(45) Date of Patent: Jul. 8, 2025

(54) ADVANCED ENERGY RECOVERY VENTILATOR

(71) Applicant: FFI IONIX IP, INC., Wilmington, DE (US)

(72) Inventors: Bamdad Bahar, Georgetown, DE (US); Jack Saltwick, Georgetown, DE (US)

(73) Assignee: FFI IONIX IP, INC., Wilmington, DE (US)

( * ) Notice: Subject to any disclaimer, the term of this patent is extended or adjusted under 35 U.S.C. 154(b) by 335 days.

(21) Appl. No.: 17/979,727

(22) Filed: Nov. 2, 2022

(65) Prior Publication Data

US 2023/0095296 A1 Mar. 30, 2023

Related U.S. Application Data

(63) Continuation-in-part of application No. 16/273,097, filed on Feb. 11, 2019, now abandoned, which is a continuation-in-part of application No. 15/800,398, filed on Nov. 1, 2017, now Pat. No. 10,890,344, which is a continuation-in-part of application No. PCT/US2016/063699, filed on Nov. 23, 2016.

(60) Provisional application No. 63/274,898, filed on Nov. 2, 2021, provisional application No. 62/629,044, filed on Feb. 11, 2018, provisional application No. 62/416,072, filed on Nov. 1, 2016, provisional application No. 62/385,175, filed on Sep. 8, 2016, provisional application No. 62/373,329, filed on Aug. 10, 2016, provisional application No. 62/353,545, filed on Jun. 22, 2016, provisional application No. 62/300,074, filed on Feb. 26, 2016, provisional application No. 62/258,945, filed on Nov. 23, 2015.

(51) Int. Cl.
*F24F 12/00* (2006.01)
*F28D 21/00* (2006.01)

(52) U.S. Cl.
CPC ........ *F24F 12/006* (2013.01); *F28D 21/0015* (2013.01)

(58) Field of Classification Search
CPC .......................... F24F 12/006; F28D 21/0015
USPC ......................................................... 454/237
See application file for complete search history.

(56) References Cited

U.S. PATENT DOCUMENTS

| | | | | |
|---|---|---|---|---|
| 2,961,222 A | * | 11/1960 | Butt | F28F 3/025 228/183 |
| 3,262,496 A | * | 7/1966 | Bawabe | F28D 9/0068 165/DIG. 388 |
| 4,442,886 A | * | 4/1984 | Dinulescu | F28F 3/083 165/76 |
| 4,449,992 A | * | 5/1984 | Yamada | F28D 21/0015 96/7 |
| 4,596,285 A | * | 6/1986 | Dinulescu | F28F 9/001 165/69 |

(Continued)

*Primary Examiner* — Claire E Rojohn, III
(74) *Attorney, Agent, or Firm* — Invention To Patent Services; Alex Hobson

(57) ABSTRACT

A composite exchange membrane is made by combining ionomer with porous polyolefin, such as polyethylene or polypropylene. The composite ion exchange membrane may be used in the core of an energy recovery ventilator. The core of the energy recovery ventilator may comprise corrugated or pleated supports for supporting the composite ion exchange membrane. The air flow into the energy recovery ventilator may be modified to actively create non-laminar flow.

11 Claims, 8 Drawing Sheets

(56) References Cited

U.S. PATENT DOCUMENTS

| | | | | |
|---|---|---|---|---|
| 4,688,629 | A * | 8/1987 | Kohnken | F28F 21/04 165/905 |
| 4,805,695 | A * | 2/1989 | Ishikawa | F28D 9/0037 165/DIG. 393 |
| 5,183,106 | A * | 2/1993 | Stancliffe | F28F 3/025 165/166 |
| 5,322,117 | A * | 6/1994 | Guetersloh | F28F 9/001 165/82 |
| 5,383,516 | A * | 1/1995 | Dinulescu | F28D 9/0062 165/82 |
| 5,599,614 | A * | 2/1997 | Bahar | H01M 8/1062 428/305.5 |
| 5,681,538 | A * | 10/1997 | Sung | F01N 3/2817 165/166 |
| 6,254,978 | B1 * | 7/2001 | Bahar | H01M 8/1039 428/305.5 |
| 6,267,176 | B1 * | 7/2001 | Bolla | F28D 9/0062 165/DIG. 387 |
| 6,951,242 | B1 * | 10/2005 | Des Champs | F24F 8/158 165/146 |
| 8,955,578 | B2 * | 2/2015 | Kwon | F28F 9/001 165/81 |
| 9,278,303 | B1 * | 3/2016 | Somani | F24F 6/14 |
| 9,797,350 | B2 * | 10/2017 | Jasper | F01N 5/02 |
| 2002/0185266 | A1 * | 12/2002 | Dobbs | F24F 3/147 165/166 |
| 2017/0370609 | A1 * | 12/2017 | Chlup | F28D 21/0014 |
| 2018/0015425 | A1 * | 1/2018 | Hirsch | B01D 71/54 |
| 2018/0043346 | A1 * | 2/2018 | Bahar | C08J 5/2262 |
| 2018/0363929 | A1 * | 12/2018 | Mullen | F28D 21/0015 |
| 2019/0100844 | A1 * | 4/2019 | Bahar | C08G 65/4012 |
| 2019/0162429 | A1 * | 5/2019 | Armatis | F28D 9/0062 |
| 2019/0225487 | A1 * | 7/2019 | Bahar | B81B 7/02 |
| 2019/0252707 | A1 * | 8/2019 | Bahar | H01M 8/065 |
| 2019/0291054 | A1 * | 9/2019 | Bahar | C02F 1/448 |
| 2020/0009500 | A1 * | 1/2020 | Liu | B01D 69/02 |
| 2020/0011549 | A1 * | 1/2020 | Spargo | F24F 3/147 |
| 2020/0141655 | A1 * | 5/2020 | Friestad, Jr. | F28F 9/001 |
| 2020/0326083 | A1 * | 10/2020 | Kebernik | F24F 3/1429 |
| 2020/0353417 | A1 * | 11/2020 | Bahar | B01D 71/52 |
| 2021/0010759 | A1 * | 1/2021 | Tan | C08F 293/00 |
| 2021/0023502 | A1 * | 1/2021 | Ueda | B01D 53/261 |
| 2021/0088286 | A1 * | 3/2021 | Sotokawa | B32B 5/022 |
| 2021/0396429 | A1 * | 12/2021 | Bahar | H01M 16/00 |
| 2021/0402356 | A1 * | 12/2021 | Hirsch | F24F 3/147 |
| 2022/0057146 | A1 * | 2/2022 | Nakazawa | F28D 9/0062 |
| 2022/0105471 | A1 * | 4/2022 | Bahar | B01D 63/10 |
| 2022/0113042 | A1 * | 4/2022 | Horie | F24F 1/0358 |
| 2022/0193613 | A1 * | 6/2022 | Bahar | B01D 69/10 |
| 2024/0342658 | A1 * | 10/2024 | Bahar | B01D 69/1213 |

* cited by examiner

ADVANCED ENERGY RECOVERY VENTILATOR

CROSS REFERENCE TO RELATED APPLICATIONS

This application is a continuation in part of U.S. patent application Ser. No. 16/273,097, filed on Feb. 11, 2019 and currently pending, and which is a continuation in part of U.S. patent application Ser. No. 15/800,398, filed on Nov. 1, 2017 and currently pending, which is a continuation in part of International Patent Application No. PCT/US2016/063699, filed on Nov. 23, 2016 which claims the benefit of U.S. provisional patent application No. 62/258,945, filed on Nov. 23, 2015, U.S. provisional patent application No. 62/300,074, filed on Feb. 26, 2016, U.S. provisional patent application No. 62/353,545, filed on Jun. 22, 2016, U.S. provisional patent application No. 62/373,329, filed on Aug. 10, 2016 and U.S. provisional patent application No. 62/385,175, filed on Sep. 8, 2016; and U.S. application Ser. No. 15/800,398 claims the benefit of priority to U.S. provisional patent application No. 62/416,072, filed on Nov. 1, 2016, and U.S. application Ser. No. 16/273,097 claims the benefit of U.S. provisional patent application No. 62/629,044, filed on Feb. 11, 2018, and this application claims the benefit of priority to U.S. provisional patent No. 63/274,898 filed on Nov. 2, 2021; the entirety of all applications listed are hereby incorporated by reference herein.

BACKGROUND OF THE INVENTION

Field of the Invention

This application is a novel composite ion exchange membrane comprising an exchange polymer, that may transport water, such as an ionomer coupled with a porous polymer and particularly a porous polyethylene or polypropylene, and the use of this novel composite ion exchange membrane in an energy recovery ventilator.

Background

Increased focus on energy efficiency in both for commercial and residential buildings has led to building envelopes becoming tighter against airflow into and out of structures. This is desirable from a heating/cooling standpoint, but requires attention be paid to ventilation of the space to ensure high indoor air quality for building occupants; air free from noxious buildup of volatile organic compounds VOCs (out-gassing carpet, furniture, etc.) cleaners, particulate (pet dander, dust etc.) and bioeffluents including carbon dioxide. To minimize the heating/cooling and (de)humidification costs associated with such ventilation, Energy Recovery Ventilators (ERVs), as generally show in FIG. 1, are designed to move heat and moisture between exhaust and fresh airstreams to pre-condition incoming air. Among various types of ERVs, fixed-plate ERVs—which transfer heat and moisture directly from one airstream to another through membranes arranged in a "core"—are uniquely advantageous in that such devices are passive (no moving parts), low maintenance, and can demonstrate negligible leakage from exhaust to fresh airstreams—enabling energy recovery from a wider range of exhaust air supplies (including bathroom exhaust) than other types of ERVs. Such advantages have made fixed-plate ERVs an increasingly popular form in the market. An analysis conducted with industry statistics[1,2] market forecasts[3], and climate data[4] estimates that total energy savings from fixed plate ERVs over a 20-year operational lifetime is 6.6 Quads. Performance enhancements will increase the rate of market uptake and energy savings

SUMMARY OF THE INVENTION

This application describes an advanced ion exchange membrane for integration into ERVs and redesigning the air-exchange core to significantly increase the energy recovery of the system. This system is anticipated to improve performance by at least 23% over conventional systems, enabling ERV systems to increase their energy benefit to 7.4 Quads nationally over a 20-year period i.e. energy savings would increase by 0.8 Quads over current, commercially available fixed-plate ERV exchangers.

It should be noted that ERVs, within standard ventilation systems, provide an opportunity to downsize heating and air-conditioning equipment due to load reductions by enabled by the ERV. An improved ERV system would therefore also allow for significant additional operational cost savings. It should also be noted that the US market has been poorly penetrated. An improved ERV core would be transformational and disruptive, enabling significant expansion of the current market for ERVs by improving economic payback for buyers. This would yield further energy savings not captured in our calculations.

Fixed-plate ERVs are simple devices: exhaust air moves through a channel formed between two parallel membrane plates and maintained by a flow-field separator. Immediately opposite the ERV membrane from the exhaust air, supply air moves through a similar flow field separator.

Academic studies suggest that the airside boundary layer can account for as much as 95% of the overall heat transfer resistance (5,6). However, analysis of commercially available membrane ERV exchangers attribute most of the moisture transfer resistance to the membrane, with airside (boundary layer) moisture transfer resistance estimated at only 10-35% of the total moisture transfer resistance (7). To maximize the energy-saving potential of fixed-plate ERVs, both the airflow dynamics through the membrane exchanger as well as water permeability characteristics of the membranes must be improved.

Over the past 30 years, commercial ERV cores have been developed for low construction cost, and not for optimized performance. With much of the U.S. supply coming from overseas, margins are squeezed, and no-one in the U.S. is in the position to expend resources to do research to improve performance. Significant improvements are feasible, yet no single entity can address these developments without the formation of a consortium and grant support.

An exemplary energy recovery ventilator may be used in a wide variety of applications including, a desiccator, such as for an ionic liquid desiccant, as a component of a sensor, as a component of used in electrolysis, as a component of a battery, as a component of an ultracapacitor, as a component of an electrochemical compressor, or a pervaporation device.

Membranes used in pervaporation devices such as evaporative coolers and liquid desiccant systems may utilize a pervaporation membrane which may be a composite ion exchange membrane. The membranes may be exposed to harsh chemicals and particulate matter in air. Porous membranes offer hydrophobicity and high moisture vapor transmission rates but are prone to fouling and degradation. Addition of a thin-film coating of an ionomer such as perfluorosulfonic acid (PFSA) renders the membrane nonporous and drastically improves membrane durability. Durability and chemical resistance are especially important in liquid desiccant-based air-conditioning systems where highly corrosive salts are used. Furthermore, although the coating adds thickness to the membrane, an optimum thickness of ionomer/hydrophilic polymer was found to improve the permeance of the membrane by as much as 40%.

It is surprising that this coating improves performance as it is a continuous film coating layer, however it is so thin, less than 5 microns, that the rate of water transfer is high enough to not negatively affect the performance. This coating also prevents clogging of the supports.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

The figures represent an illustration of some of the embodiments of the present invention and are not to be construed as limiting the scope of the invention in any manner. Further, the figures are not necessarily to scale, some features may be exaggerated to show details of particular components, Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
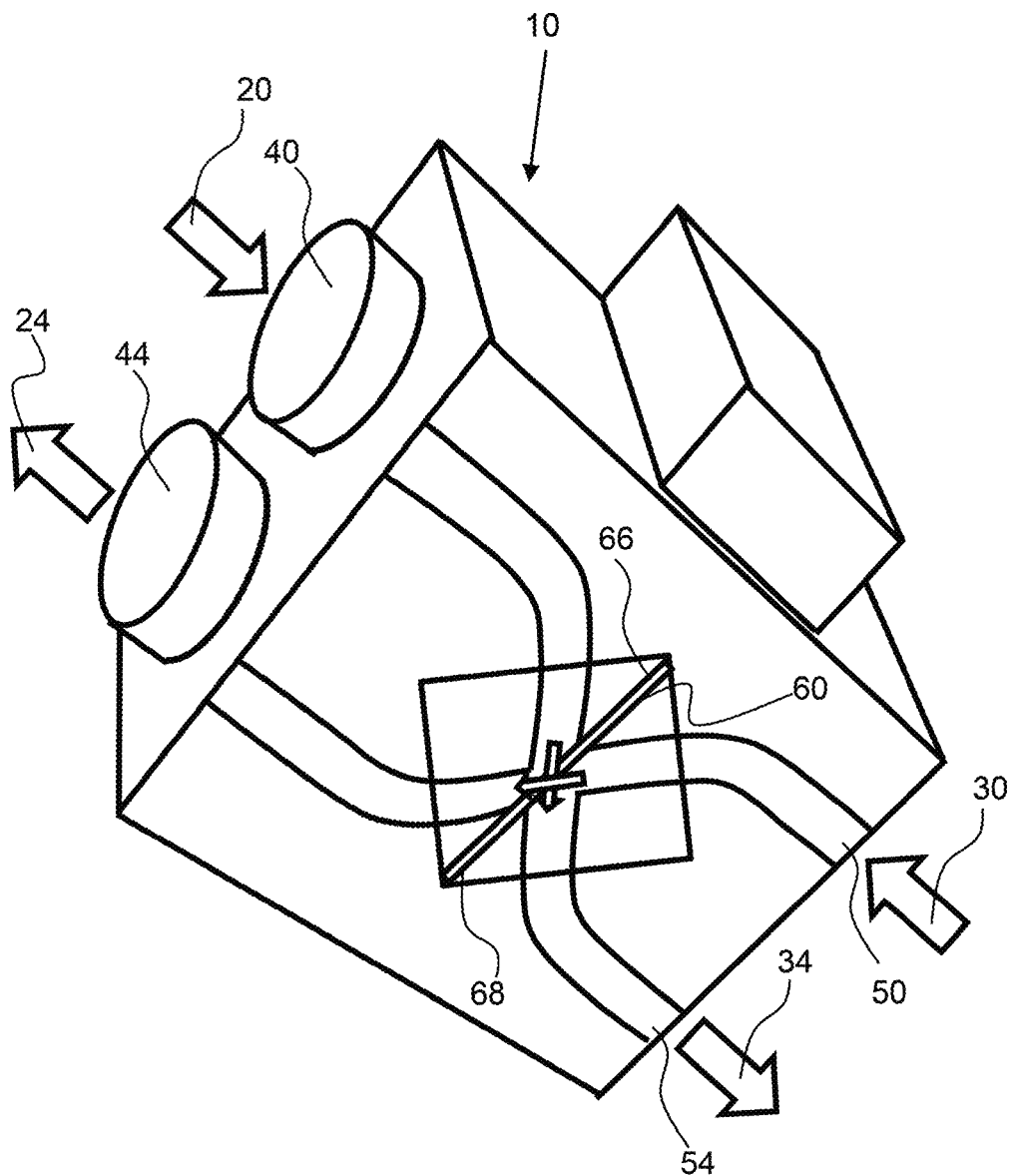
FIG. 1 shows a perspective view of an exemplary energy recovery ventilator

Non-permeable, as used herein, is defined as a material having greater than a 500 second Gurley Densometer reading, as measured using an automatic Gurley Densometer 4340, from Gurley Precision Instruments, Inc., Troy, NY As shown in FIG. 1, an exemplary energy recovery ventilator 10 utilizes a composite ion exchange membrane 60 to transfer heat and humidity from extract air 30 to intake air 20. The intake air 20 enters through an intake air inlet 40 and flow past the intake side 66 of the composite ion exchange membrane before exiting through the exhaust air outlet as exhaust air 24. The exchange air 30 enters through the extract air inlet 50 and flows past the composite ion exchange membrane before exiting through the supply air outlet 54 as supply air 34. Heat and/or humidity are exchanged through the composite ion exchange membrane from the exchange air to the intake air. This system may be a low cost way to keep air fresh in a room or to reduce humidity in an enclosed space.

Figure 2:
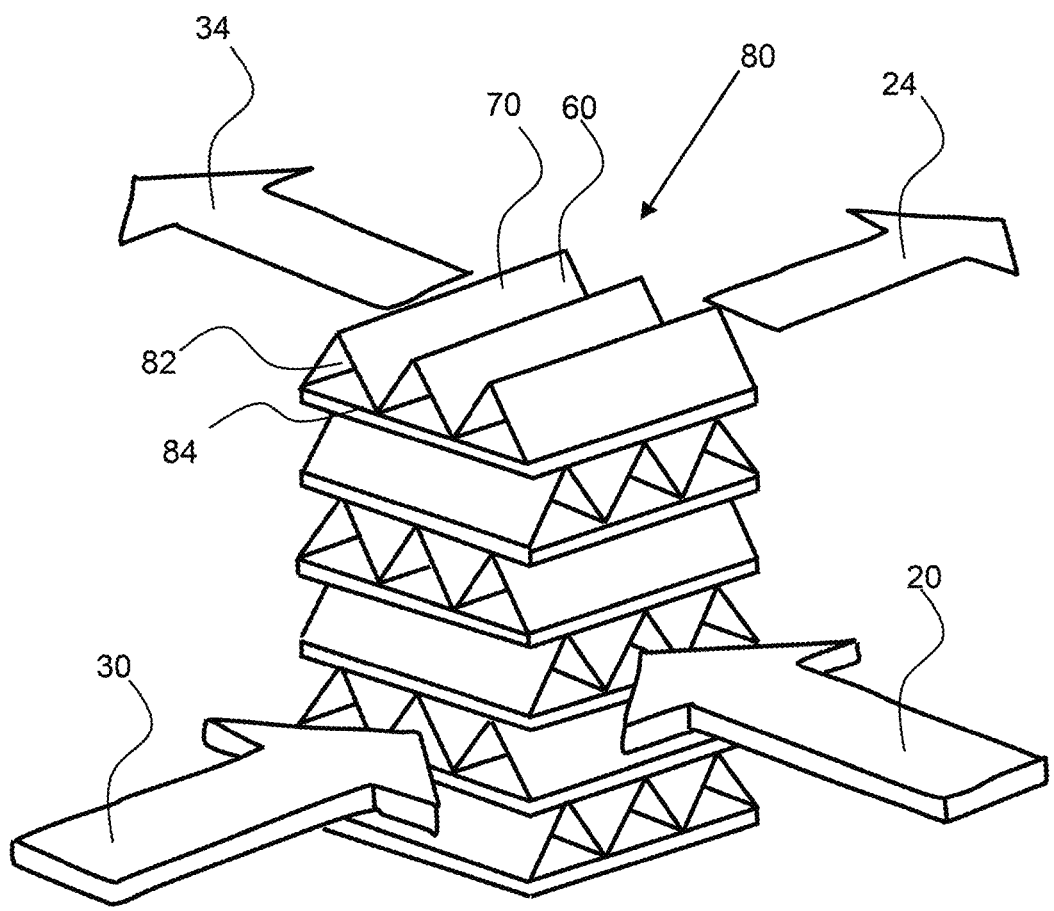
FIG. 2 shows a perspective view of an exchange module of an exemplary energy recovery ventilator having a pleated transfer medium forming flow channels.

As shown in FIG. 2, the composite ion exchange membrane may be configured into an exchange module 80 having flow channels 82 formed from pleats 70 of the composite ion exchange membrane 60. A flow channel may be formed on one side by the pleated composite ion exchange membrane and on the opposing side by a flat sheet layer 84 of the composite ion exchange membrane.

Core Design

The core of an energy recovery ventilator may have pleated or corrugated supports for the transfer medium, or ion exchange membrane, as shown in FIG. 2.

Airflow Design

Figure 3:
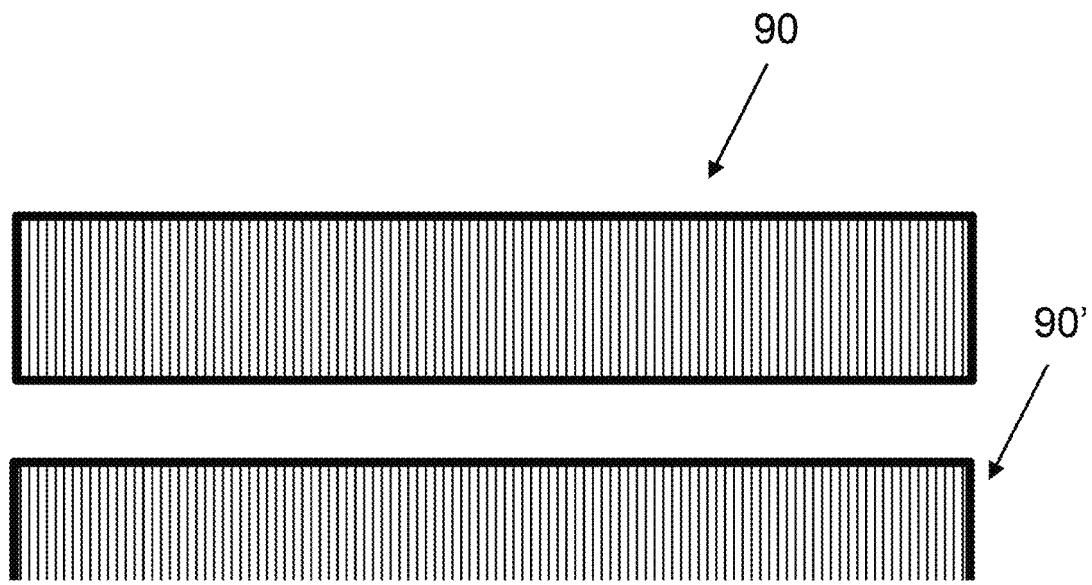
FIG. 3 shows diagrams of exemplary air twisters for an ERV.

A twister 90 or 90', as generally shown in FIG. 3 may create turbulent flow through the energy recovery ventilator which may enhance exchange through the composite ion exchange membrane. A twister comprises a plurality of elongated members that extend into the flow of the intake air and/or extract air.

Figure 4:
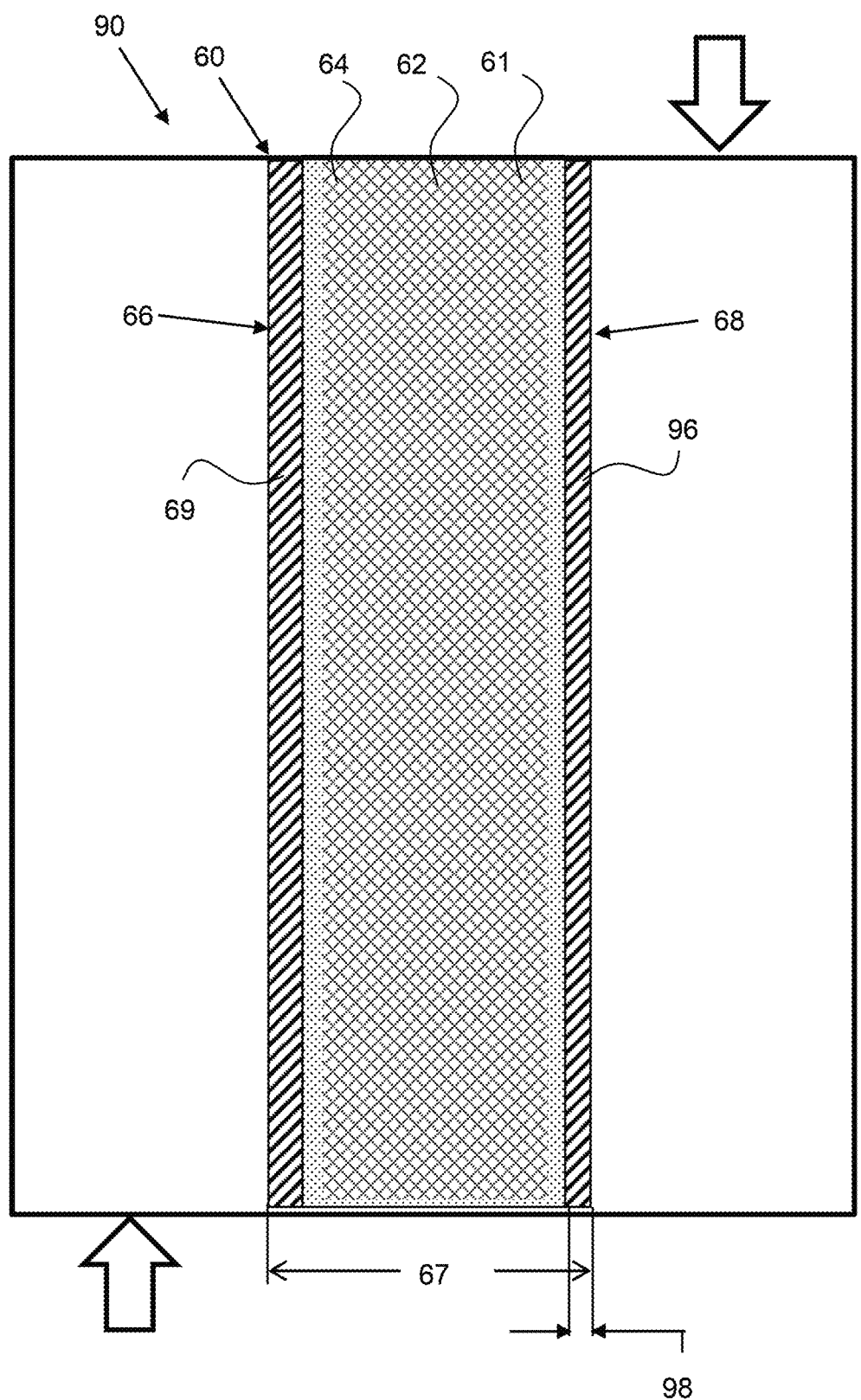
FIG. 4 shows a cross-sectional diagram of an exemplary composite ion-exchange membrane

As shown in FIG. 4, a composite ion exchange membrane 60 comprises a porous polyolefin 62 and an exchange polymer 64, which may be an ionomer. The porous polyolefin acts as a support layer for the exchange polymer and has pores that extend through the thickness. The exchange polymer may be coated on one or both sides of the porous polyolefin layer and/or may be imbibed into the pores of the porous polyolefin, as shown. The composite exchange membrane 60 has an intake side 66, exposed to the intake air, and an extract side 68, exposed to the extract air. The thickness 67 of the composite exchange membrane 60, such as an ion exchange membrane, may be very low, such as no more than about 50 microns, no more than about 25 microns, no more than about 15 microns, no more than about 10 microns and even no more than 5 microns, and any range between and including the values provided. The thinner the composite ion exchange membrane, the more transfer of heat and humidity through the layer.

A pervaporation membrane may include a composite ion exchange membrane 60 that may include a thin-film of an exchange polymer, such as an ionomer, including a perfluorosulfonic acid (PFSA), which may be a continuous film, having a thickness 98 that is ultra-thin, as described herein, having a thickness of less than 5 microns. This or these thin-films of exchange polymer render the composite exchange membrane non-permeable to a bulk flow of gas, as described herein as having a 500 second or more time reading as measured using an automatic Gurley Densometer 4340, from Gurley Precision Instruments, Inc., Troy, NY The thin-film of exchange polymer 69 may be on the intake side 66 and/or a thin-film of exchange polymer 96 may be on the extract side 68. A thin-film of exchange polymer on the air side is preferred as it will prevent contamination of the porous support layer 61, such as a porous polyolefin 62.

Figure 8:
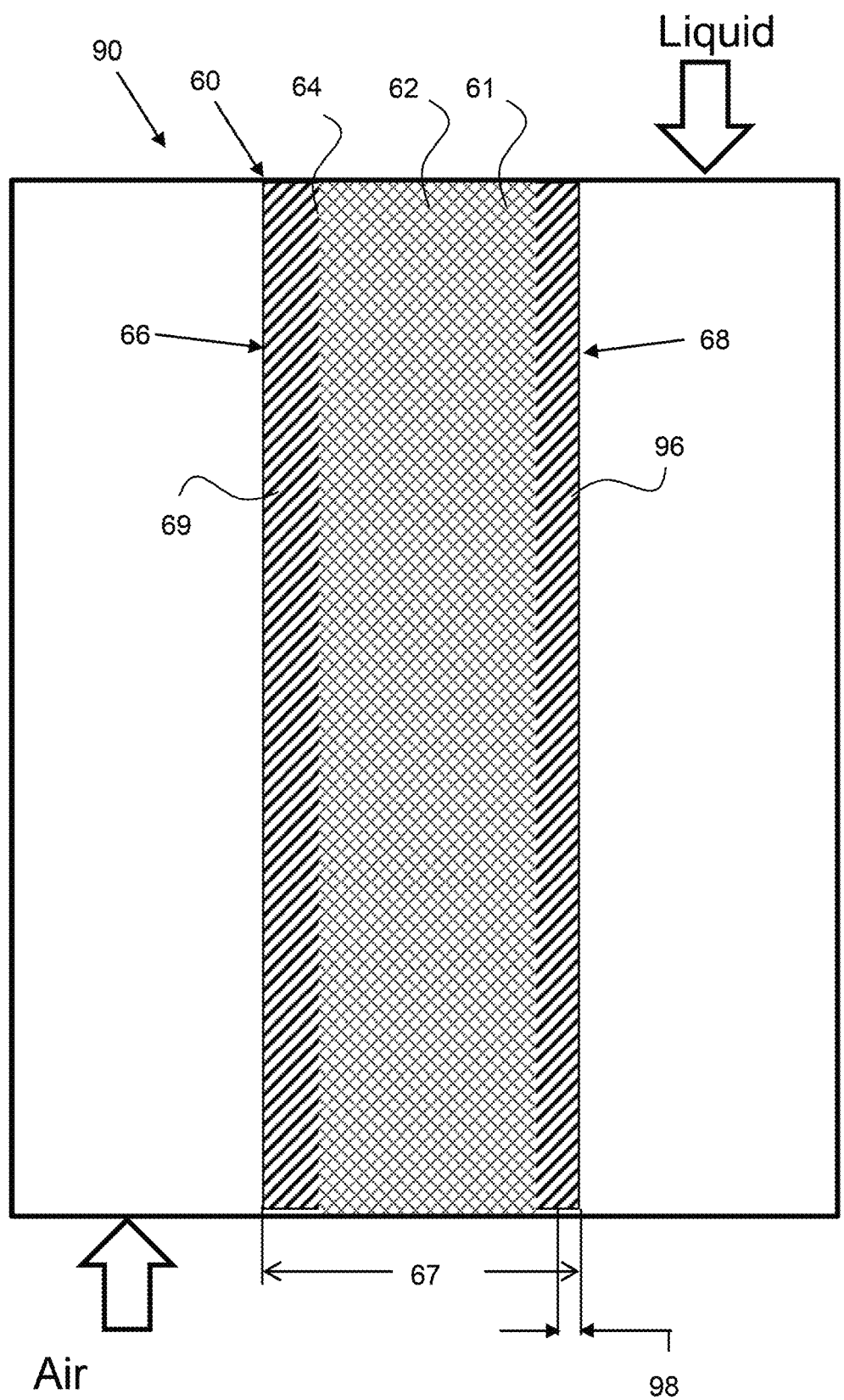
FIG. 8 shows an exemplary pervaporation device with a pervaporation membrane such that a liquid flows on one side of the membrane and air flows on the other side of the membrane. Water transfers from either side of the membrane based on vapor pressure gradient.

As shown in FIG. 8 a composite exchange membrane 60 comprises a porous polyolefin 62 and an exchange polymer 64, which may be an ionomer, or other exchange polymer that is not ionically conductive. The porous polyolefin acts as a support layer for the ionomer and has pores that extend through the thickness. The exchange polymer may be coated on one or both sides of the porous polyolefin layer and/or may not completely imbibed into the pores of the porous polyolefin, to enable the porous support to be permeable. The composite ion exchange membrane 60 has a side, exposed to air, and a side, exposed to a liquid such as water in evaporative cooler and a salt such as Lithium Chloride in a liquid desiccant system. The thickness 67 of the composite ion exchange membrane 60 may be very low, such as no more than about 50 microns, no more than about 25 microns, no more than about 15 microns, no more than about 10 microns and even no more than 5 microns, and any range between and including the values provided. The thinner the composite ion exchange membrane, the more transfer of heat and humidity through the layer. A pervaporation membrane may include a composite ion exchange membrane 60 that may include a thin-film of an exchange polymer, such as an ionomer such as perfluorosulfonic acid (PFSA), which may be a continuous film, having a thickness 98 that is less ultra-thin, as described herein, having a thickness of less than 5 microns. This or these thin-films of exchange polymer render the composite exchange membrane non-permeable to a bulk flow of gas, as described herein as having a 500 second or more time reading as measured using an automatic Gurley Densometer 4340, from Gurley Precision Instruments, Inc., Troy, NY The thin-film of exchange polymer 69 may be on the air side and/or a thin-film of exchange polymer 96 may be on the liquid side. A thin-film of exchange polymer on the air side is preferred as it will prevent contamination of the porous support layer 61, such as a porous polyolefin 62. The porous support may be porous and have very high moisture vapor transmission and the thin-film exchange polymer may have a high moisture vapor transmission rate to provide a composite with a higher moisture vapor transmission rate than a composite with exchange polymer imbibed into the porous scaffold to substantially fill the pores of the porous scaffold to render it non-permeable, as described herein.

New High-Performance Membranes:

Ion exchange membranes, typically used for electro-chemical applications, demonstrate the properties required for an enhanced ERV membrane. High water permeances ($2.00 \times 10^{-8}$ kg s$^{-1}$ m$^{-2}$ Pa$^{-1}$, FIG. 5) can be achieved with both cation-exchange membranes (such as commercially-available perfluorosulfonic acid (PFSA) membranes) and novel anion exchange membranes, typically used for fuel cells. Traditional ion exchange resins are prohibitively expensive (generally, a bare minimum of \$50/m$^2$ when cast into a composite membrane suitable for ERVs). However, application of thin-film of exchange polymer (<5 urn) of exchange polymer, such as an ionomer, on one side of a porous material (the side that contacts the air) is sufficient in most cases to realize the benefits of improved permeance and resistance to chemicals and fouling. In such an embodiment, the cost of a perfluorosulfonic acid (PFSA) membrane can be in the range of \$5-\$20/m$^2$. Therefore, in applications such as liquid-based air conditioning, evaporative cooling and other pervaporation processes involving harsh chemicals, the above embodiment demonstrates an improvement in properties as compared to porous membranes and can be produced at a justifiable low cost.

Figure 5:
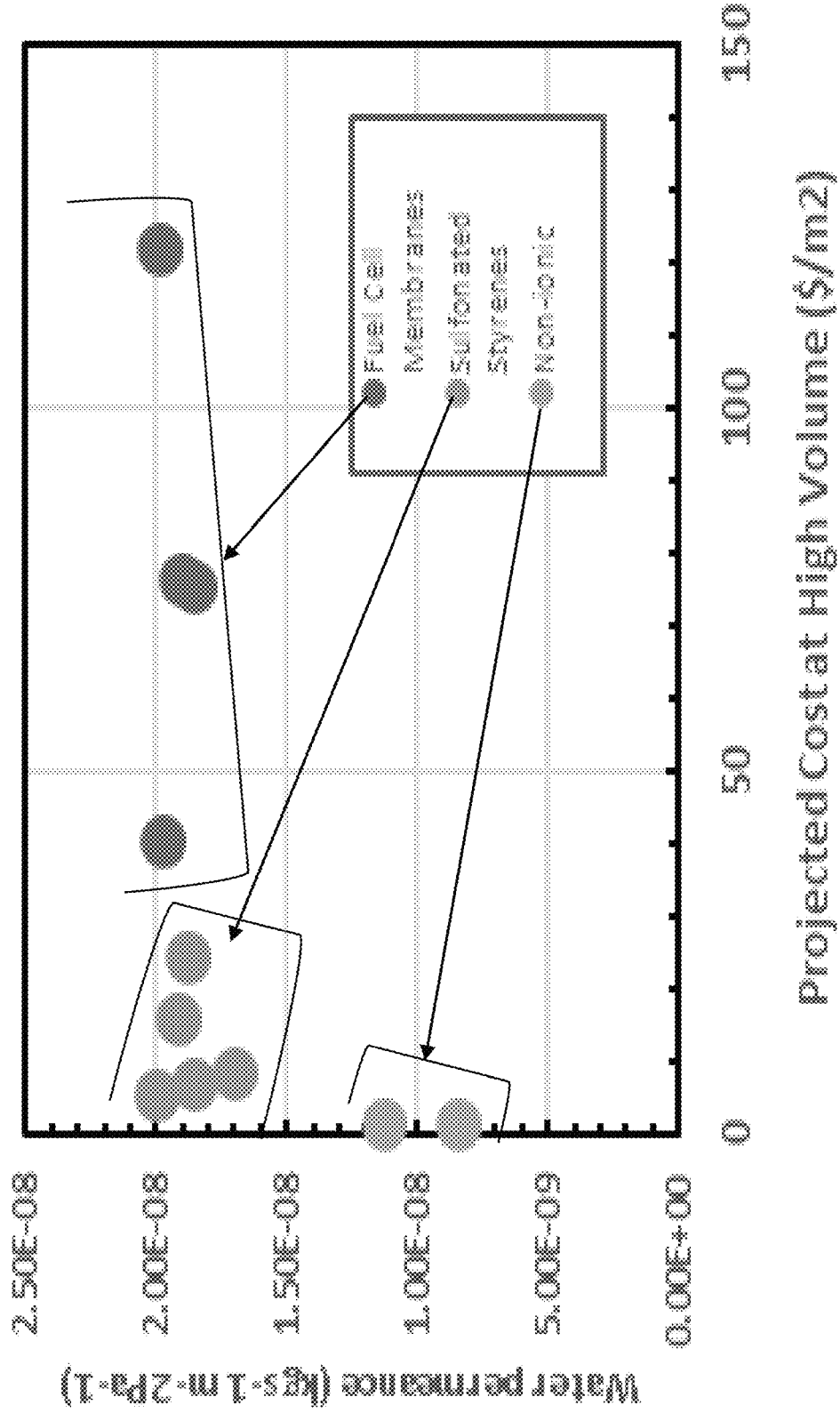
FIG. 5 shows a graph of water permeance vs. projected materials cost for various polymer membranes
Figure 6:
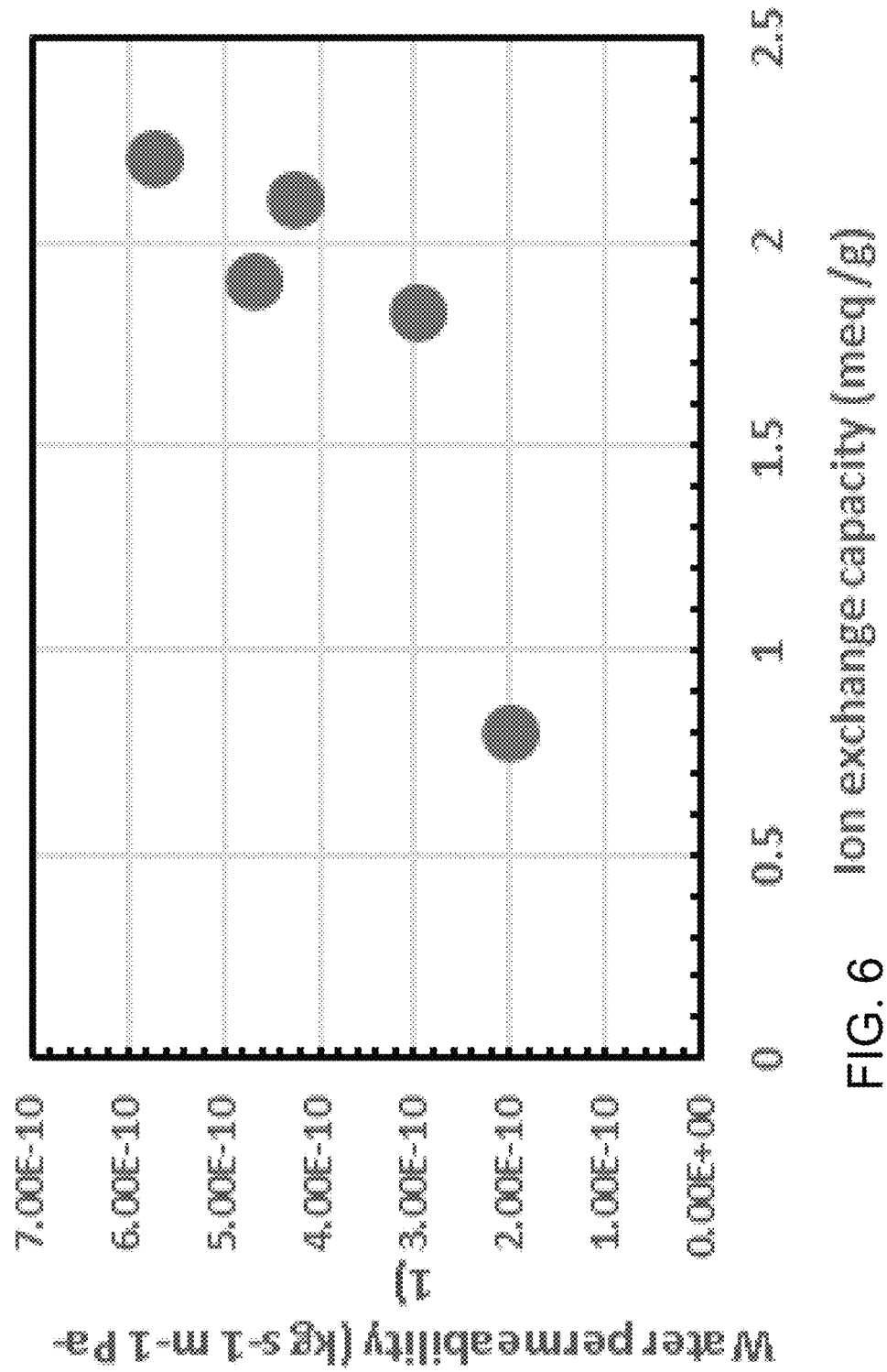
FIG. 6 shows a graph of water permeability vs. ion exchange capacity for styrene-based ion exchange resins.

Other ion exchange materials exist that demonstrate similar water transport properties to fuel cell membranes while being based on less expensive, commodity chemicals. For example, sulfonated polystyrene or sulfonated styrene-ethylene-butadiene (SEBS) copolymers offer high water permeance ($2.00 \times 10^{-8}$ kg s$^{-1}$ m$^{-2}$ Pa$^{-1}$) at a low (approx. \$5/m$^2$) cost (FIG. 5). These materials are currently in use for ERV applications. However, none of them have ion exchange capacity (IEC) greater than 2.5 meq/g. There is a correlation between IEC (the degree to which the polymer is functionalized) and water permeability (the thickness-independent property of a material to transport water) (FIG. 6). With new synthesis techniques, ion exchange resins based on commodity SEBS polymers can be produced with an IEC up to 6.0 meq/g (FIG. 7), more than twice that of commercially-available resins. Although these copolymers retain some mechanical strength, they do need to be 'composited' i.e. combined with a thin, porous support layer, to improve dimensional stability and provide additional mechanical reinforcement in operation.

One key element of this advanced composite material is the use of porous polyethylene or polypropylene as the support matrix versus expanded polytetrafluoroethylene (ePTFE) as patented by W. L. Gore and Associates. Polyolefins are more suited to many Non-fluorinated exchange polymer, such as ionomers, such as SEBS, but also advanced phenyls-based systems as patented by Rensselaer Polytechnic Institute and University of Delaware. Porous Polyolefins can be produced in a number of different ways which is more commonly used as a separator for lithium-ion batteries. Its use as a base for composite ion exchange media is novel. These materials can be made via solvent extrusion or an expansion process similar to the production of ePTFE, by using Ultra-high-molecular-weight polyethylene (UHMWPE) i.e. producing a compressed puck from powders, then pultruding through a die (with temperature, and solvent) and then subsequent expansion to stretch out the pultruded film to many times the width of the slot die. Because they are not perfluorinated substrates, the physical compatibility of the exchange polymers and solutions is improved with these alternates substrates.

Novel Core Construction:

Without fundamental changes in core design and construction, advanced membranes cannot operate to their full potential. It is well known that traditional construction methods employed to build ERV cores use corrugated triangular spacers between membrane sheets to enable air flow. This is a low cost, simple approach that provides for essentially-laminar flow across the membrane. To reduce resistance due to boundary layer formation in ERV cores, the present invention contemplates the integration of 'air twisters' into the ERV core right at the inlet to air (see attached photograph). The degree of rotation (turbulence, as expressed by measured Reynolds number), the length of the air twisters, and overall width of the air slot are important parameters that must be optimized to obtain optimum energy recovery. A schematic of this design is provided.

Figure 7:
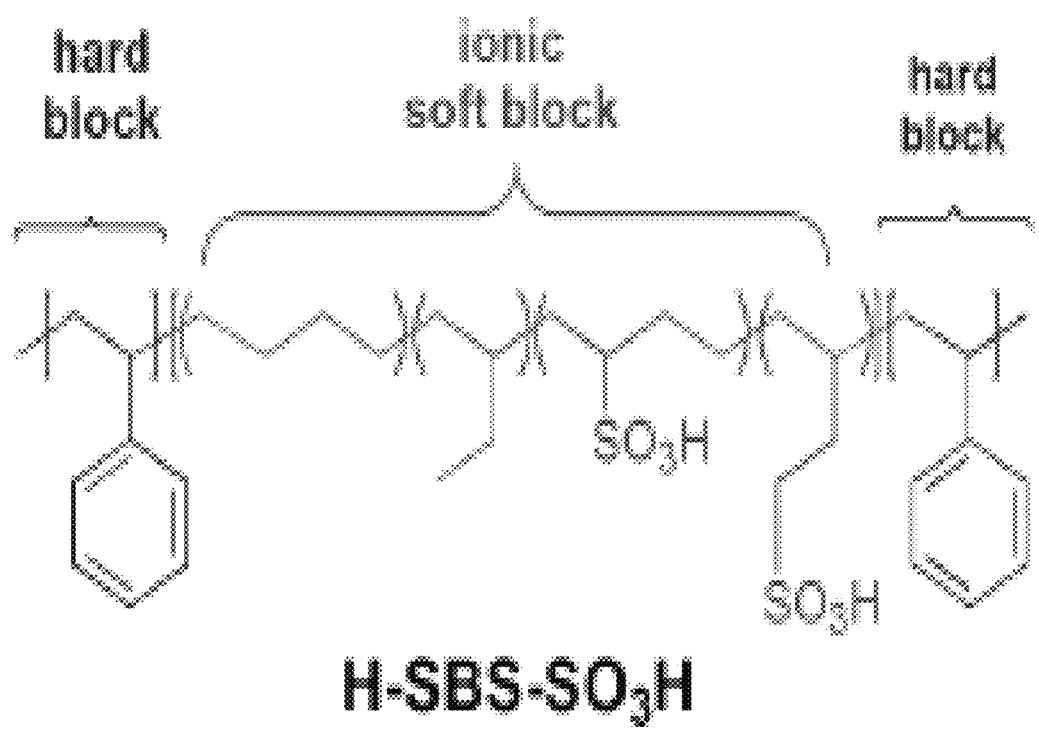
FIG. 7 shows the chemical structure of an exemplary novel styrene-based ion exchange resin structure, with maximum ion exchange capacity (IEC) of up to 6.2 meq/g.

The exchange polymer may be a styrene based ion exchange material, as shown in FIG. 7, and may have a maximum exchange capacity of up to 6.2 meq/g.

REFERENCES

The entirety of all references listed below are hereby incorporated by reference herein.
1. AHRI. *Confidential Reports: Air-to-Air Energy Recovery Ventilation Equipment.* 2017,
2. -. *Confidential Reports: Air-to-Air Energy Recovery Ventilation Equipment.* 2016.
3. Markets and Markets. *Energy Recovery Ventilator Market—Global Forecast to 2021.* 2016.
4. *Engineering Weather Data.* [CD] Asheville, NC: National Climatic Data Center, 2000.
5. Zhang L Z, Niu J L., Energy requirements for conditioning fresh air and the long-term savings with a membrane-based energy recovery ventilator in Hong Kong. Energy 2001; 26:119-35.
6. Jason Woods, Membrane processes for heating, ventilation, and air conditioning, Renewable and Sustainable Energy Reviews 33(2014)290-304
7. *Heat transfer and pressure drop in spacer-filled channels for membrane energy recovery ventilators.* Jason Woods, Eric Kozubal. 2013, Applied Thermal Engineering, pp. 868-876.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An advanced energy recovery ventilator comprising:
   a) a composite ion exchange membrane comprising:
      i) a porous polyolefin support layer having a thickness and comprising a plurality of pores that extend through the thickness;
      ii) an exchange polymer coupled to the porous support layer;
      iii) an intake side;
      iv) an extract side that is opposite the intake side;
   wherein the composite ion exchange membrane is non-permeable, having a Gurley Densometer reading of at least 500 seconds;
   b) an intake air inlet for receiving intake air
   c) an exhaust air outlet;
   wherein intake air enters the intake air inlet, passes by the intake side of said composite ion exchange membrane and exits the exhaust air outlet of the energy recovery ventilator as exhaust air;
   d) an extract air inlet for receiving extract air;
   e) a supply air outlet;
   wherein extract air enters the extract air inlet, passes by the extract side of said composite ion exchange membrane and exits the supply air outlet of the energy recovery ventilator as supply air; and
   wherein the exchange polymer is a thin-film of said exchange polymer extending on at least one of the intake side and extract side of the composite ion exchange membrane, and
   wherein the thin film of said exchange polymer has a thickness of no more than 5 microns, and
   wherein the thin-film of said exchange polymer is non-permeable, having a Gurley Densometer reading of at least 500 seconds.

2. The advanced energy recovery ventilator of claim 1, wherein the exchange polymer is a styrene-based exchange ionomer.

3. The advanced energy recovery ventilator of claim 2, wherein the thin-film of exchange polymer is between 1 micron and 5 microns thick.

4. The advanced energy recovery ventilator of claim 1, wherein the thin-film of exchange polymer extends on the intake side of the composite ion exchange membrane, wherein said exchange polymer is a styrene-based exchange polymer.

5. The advanced energy recovery ventilator of claim 4, wherein the thin-film of exchange polymer is between 1 micron and 5 microns thick.

6. The advanced energy recovery ventilator of claim 4, wherein said thin-film of exchange polymer extends on both the intake side the extract side of the composite ion exchange membrane,
   wherein said exchange polymer is a styrene-based exchange polymer.

7. The advanced energy recovery ventilator of claim 6, wherein the thin-film of exchange polymer on both the intake side and extract side is no more than 5 microns thick.

8. The advanced energy recovery ventilator of claim 7, wherein the thin-film of exchange polymer on both the intake side and extract side is between 1 micron and 5 microns thick.

9. The advanced energy recovery ventilator of claim 1, wherein the thin-film of exchange polymer extends on both the extract side of the composite ion exchange membrane, wherein the thin-film of exchange polymer on the extract side is a styrene-based exchange polymer.

10. The advanced energy recovery ventilator of claim 9, wherein the thin-film of exchange polymer is between 1 micron and 5 microns thick.

11. The advanced energy recovery ventilator of claim 1, wherein the composite ion exchange membrane is configured in an exchange module comprising a plurality of flow channels configured from corrugated composite exchange membrane.

* * * * *